(12) United States Patent
Saito

(10) Patent No.: US 7,903,276 B2
(45) Date of Patent: *Mar. 8, 2011

(54) COMMUNICATING APPARATUS AND PROGRAM

(75) Inventor: Hitoshi Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 300 days.

This patent is subject to a terminal disclaimer.

(21) Appl. No.: 12/144,556

(22) Filed: Jun. 23, 2008

(65) Prior Publication Data

US 2008/0259407 A1    Oct. 23, 2008

Related U.S. Application Data

(62) Division of application No. 10/461,481, filed on Jun. 16, 2003, now Pat. No. 7,400,426.

(30) Foreign Application Priority Data

Jun. 21, 2002 (JP) .............................. 2002-180951

(51) Int. Cl.
*G06F 3/12* (2006.01)
(52) U.S. Cl. ...................... 358/1.15; 358/1.13; 358/436
(58) Field of Classification Search .................. 358/435, 358/436, 466; 379/100.01
See application file for complete search history.

(56) References Cited

U.S. PATENT DOCUMENTS

| 5,668,803 | A | 9/1997 | Tymes |
| 6,311,233 | B1 | 10/2001 | Nishioka |
| 7,006,261 | B1 | 2/2006 | Mizutani |
| 2002/0136195 | A1 | 9/2002 | Kurtz |

FOREIGN PATENT DOCUMENTS

| JP | 7-162644 | 6/1995 |
| JP | 10-248006 | 9/1998 |
| JP | 10-308863 | 11/1998 |
| JP | 11-261785 | 9/1999 |

*Primary Examiner* — Mark K Zimmerman
*Assistant Examiner* — Lennin Rodriguez
(74) *Attorney, Agent, or Firm* — Fitzpatrick, Cella, Harper & Scinto

(57) ABSTRACT

It is an object to provide a communicating apparatus and its program in which in the case where the RTC pattern or the RCP frame cannot be received due to the noises or in the case where a modem diverges and data cannot be normally demodulated, a procedure signal can be certainly detected, the modem can advance to a low-speed mode, and a possibility of a communication error can be remarkably reduced. During the image reception, both a carrier of V.21ch2 modulation and data signal quality (EQM) in a high-speed mode are, in parallel, monitored. When the data signal quality (EQM) deteriorates to a value larger than or equal to a predetermined threshold value and the carrier of the V.21ch2 modulation is detected, the modem advances to the low-speed mode and the procedure signal is received.

7 Claims, 4 Drawing Sheets

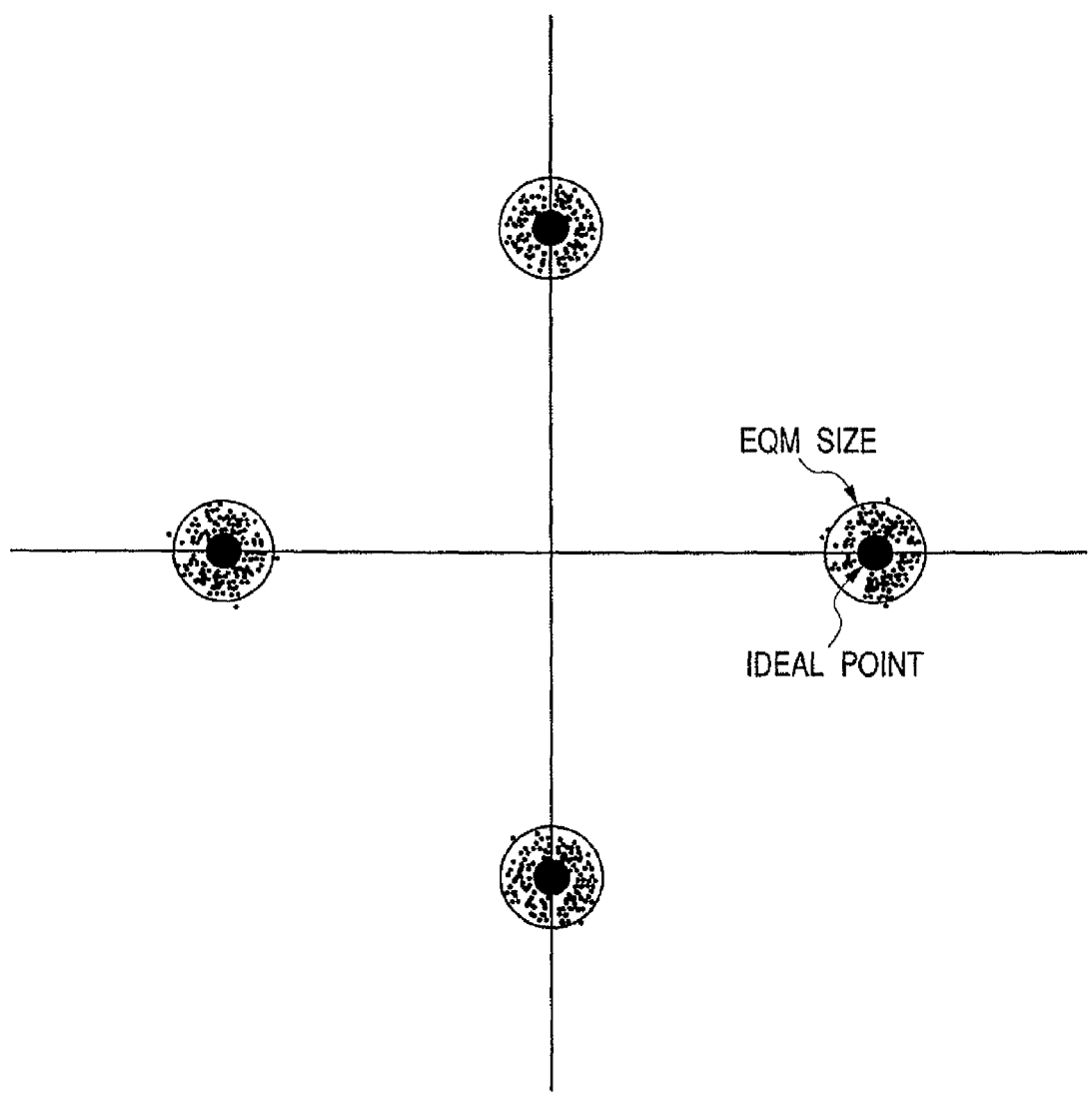

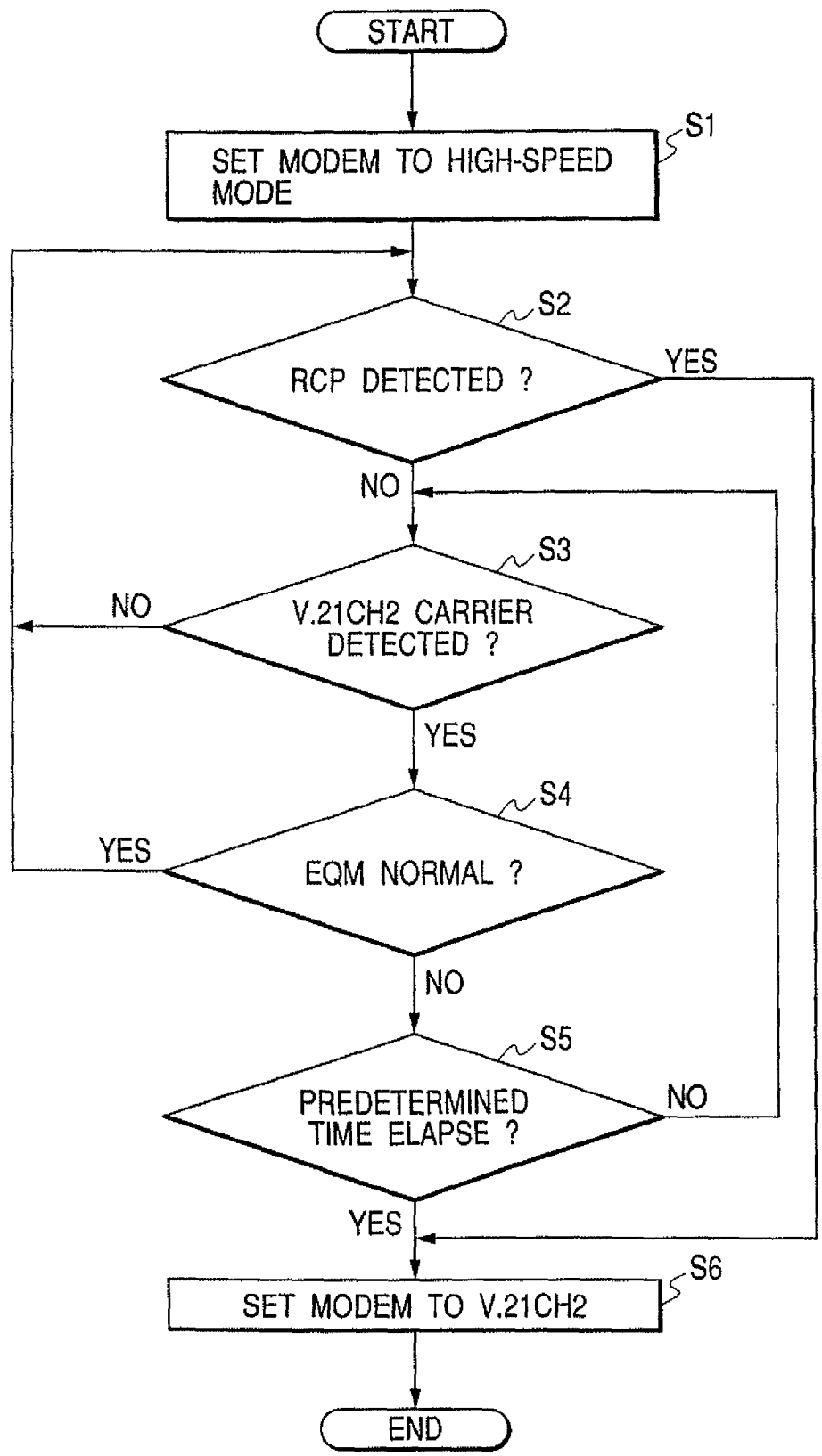

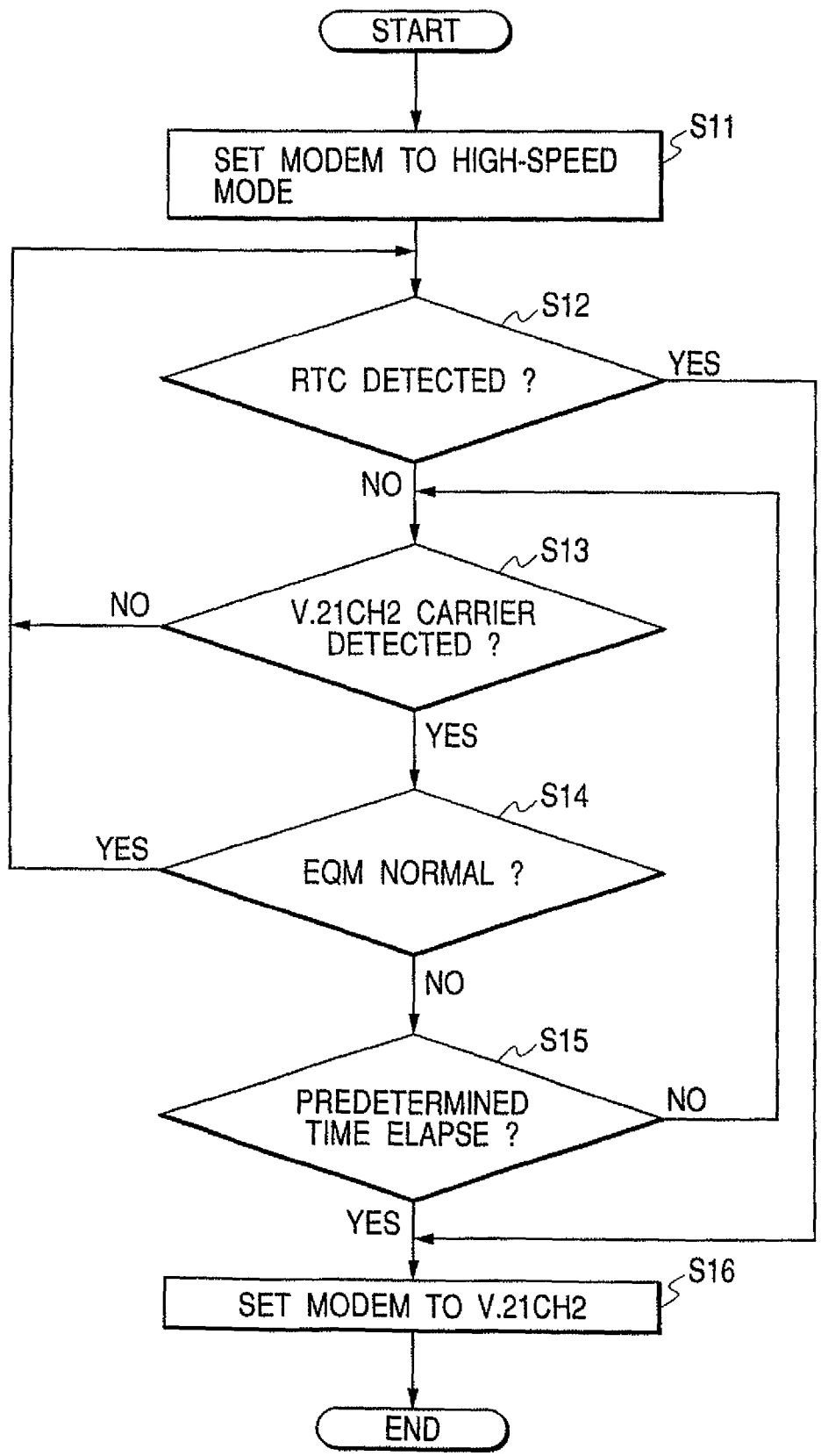

COMMUNICATING APPARATUS AND PROGRAM

This application is a division of application Ser. No. 10/461,481, filed Jun. 16, 2003 (allowed).

BACKGROUND OF THE INVENTION

1. Field of the Invention

The invention relates to a communicating apparatus such as a facsimile apparatus or the like.

2. Related Background Art

In the case of receiving an image by a facsimile apparatus according to Recommendation T.30, an RTC pattern is detected in a non-ECM procedure or an RCP frame is detected in an ECM procedure, thereby completing reception of the image of one page, and the processing routine advances to a post-procedure.

However, in the case where noises are applied to a position of the RTC pattern or the RCP frame at a rear edge of the image or in the case where a modem diverges (or malfunctions) and a signal cannot be normally demodulated, since the RTC pattern or the RCP frame cannot be detected, there is a case where a receiver cannot advance to the post-procedure, only a transmitter advances to the post-procedure, and a communication error occurs.

To avoid such a communication error, in the conventional techniques, while an image is received in a high-speed mode such as V.17 or the like, a carrier of low-speed V.21ch2 modulation which is used in a procedure signal is monitored and when the carrier of the low-speed V.21ch2 modulation is detected, it is determined that the transmitter has advanced to the post-procedure, the image reception is finished, the mode is switched to a low-speed mode, and the procedure signal is received. With respect to a communicating procedure of the facsimile apparatus, transmission and reception of the procedure are made by V.21ch2 not by V.21ch1.

However, in the foregoing conventional technique, since QAM (Quadrature Amplitude Modulation) is used in the high-speed mode which is used for image transmission such as V.17 or the like, a frequency band which it occupies is wide and the same frequency component as the carrier of the V.21ch2 modulation is also included in signal components thereof.

There is, consequently, a problem such that it is difficult to certainly detect the carrier of the V.21ch2 modulation and it is possible that the communication error occurs adversely in a state where while the image signal is normally received, it is erroneously recognized that the carrier of the V.21ch2 modulation has been received and the mode advances to the low-speed mode.

SUMMARY OF THE INVENTION

It is an object of the invention to provide a communicating apparatus and its program, in which in the case where an RTC pattern or an RCP frame cannot be received due to noises or in the case where a modem diverges and data cannot be normally demodulated, the apparatus can advance to a low-speed mode after having detected a procedure signal certainly, and a possibility of a communication error can be remarkably reduced.

BRIEF DESCRIPTION OF THE DRAWINGS

FIG. 2 is a diagram showing deviation amounts of a demodulation result from ideal points in a quadrature amplitude modulation;

FIG. 3 is a flowchart showing the operation in the case of receiving an image by an ECM in the embodiment; and FIG. 4 is a flowchart showing the processing operation in the case of receiving an image by a non-ECM in the embodiment.

DETAILED DESCRIPTION OF THE PREFERRED EMBODIMENT

Figure 1:
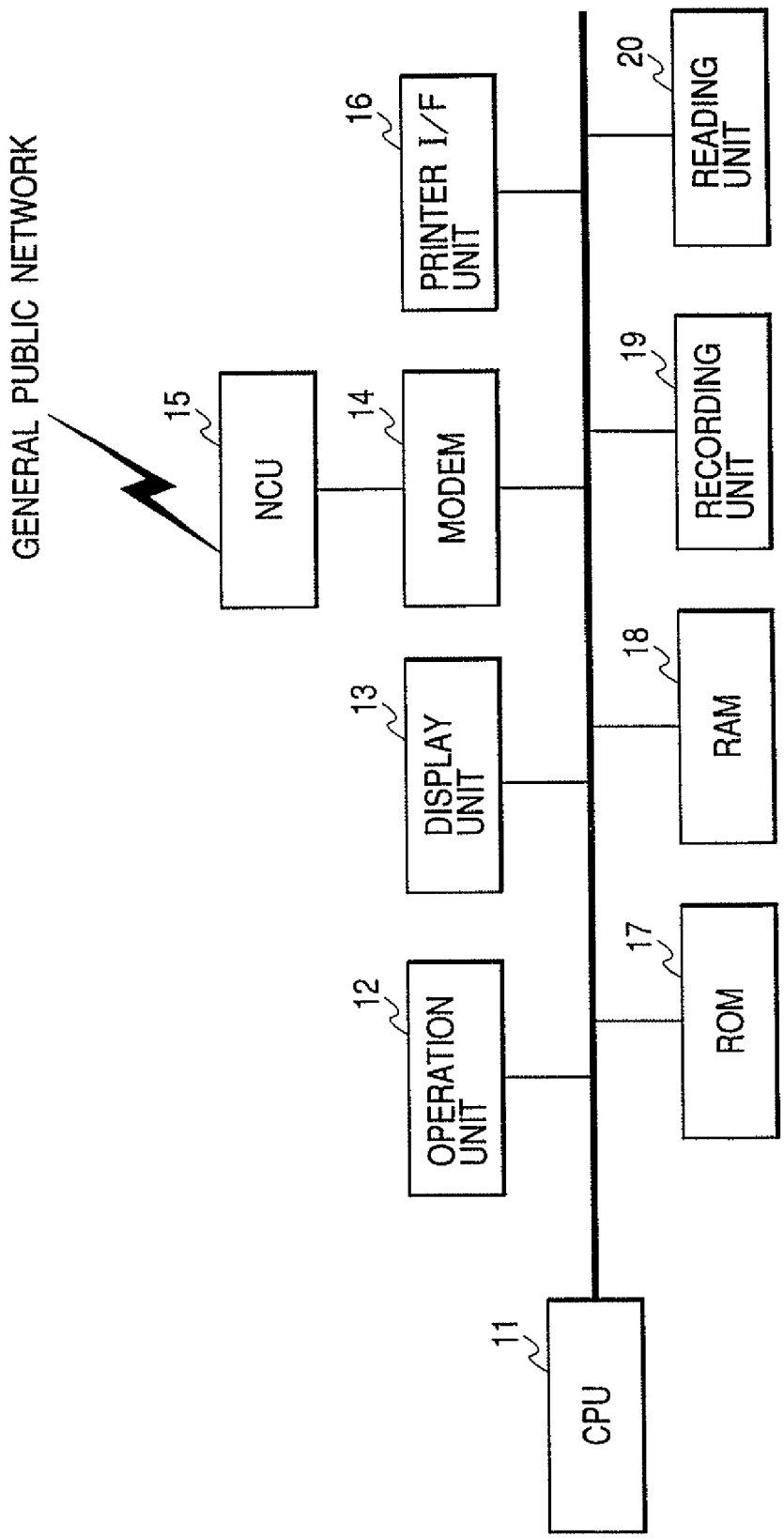
FIG. 1 is a block diagram showing a facsimile apparatus FS1 according to an embodiment of the invention.

FIG. 1 is a block diagram showing a facsimile apparatus (communicating apparatus) FS1 according to an embodiment of the invention.

In the facsimile apparatus FS1, a CPU 11 is a system control unit for controlling the whole apparatus.

A ROM 17 stores a control program of the CPU 11.

That is, the control program stored in the ROM 17 programs an example of realizing monitoring means for executing, in parallel, the monitoring of a signal in a low-speed mode which is used in a procedure signal and the monitoring of quality of a data signal in a high-speed mode while a modem is set to the high-speed mode and an image is received.

The control program stored in the ROM 17 also programs an example of realizing receiving means for setting the modem to the low-speed mode and receiving the procedure signal in the case where the signal of the low-speed mode is detected and the data signal quality has deteriorated to a value larger than (or equal to if necessary) a threshold value which has arbitrarily been predetermined.

A RAM 18 stores program control variables and the like and also stores various registration data registered by the operator and image data.

An operation unit 12 is constructed by a keyboard, a touch panel, or the like. The operator executes various inputting operations by the operation unit 12.

A display unit 13 displays a message to the operator by an LCD, an LED, or the like and notifies her/him of it.

A modem 14 modulates and demodulates a transmission/reception signal of the facsimile apparatus, executes modulation/demodulation in the high-speed mode such as V.27ter/V.29/V.17 or the like which is used for image transmission, and executes modulation/demodulation of V.21ch2 which is used for transmission of the procedure signal. Also, the modem 14 detects a carrier of the V.21ch2 modulation during the reception in the high-speed mode which is necessary in the embodiment. Further, the modem 14 has a function of reading out an EQM value indicative of the data signal quality during the reception in the high-speed mode.

A Network Control Unit (NCU) 15 connects the modem 14 to a telephone line and it transmits a selection signal (dial pulse) and detects a call signal.

A printer I/F unit 16 has a function for connecting the facsimile apparatus FS1 to an external PC when it is used as a printer.

A recording unit 19 is an engine unit of the printer and has a function for receiving image information and printing an image onto recording paper.

A reading unit 20 has a function for reading an image of an original.

Subsequently, the specific operation of the embodiment will be described.

FIG. 3 is a flowchart showing the operation in the case of receiving an image in the ECM in the embodiment.

Upon image reception, in step S1, the modem 14 is set to the high-speed mode. The high-speed mode is a modulation system of V.27ter/V.29/V.17 or the like which is used for image transmission.

When the image reception is started, in step S2, whether the RCP frame has been received or not is discriminated. If the RCP frame has been received, since this means that the image signal has been finished, step S6 follows. The modem 14 is set to the low-speed mode, thereby preparing for the reception of the procedure signal.

If it is determined in step S2 that the RCP frame is not received, the presence or absence of the carrier of the V.21ch2 modulation is discriminated in step S3. If the carrier is not detected, the processing routine is returned to step S2 and the above processes are repeated.

If the carrier of V.21ch2 is detected in step S3, data signal quality (EQM: Eye Quality Monitor) of the modem is discriminated in step S4.

If it is determined in step S4 that the data signal quality (EQM) of the modem indicates a normal value which is equal to or less than the threshold value, it is determined that the detection of the carrier of V.21ch2 in S3 has erroneously been recognized, the processing routine is returned to step S2, and the above processes are continued.

If it is determined in step S4 that the data signal quality (EQM) has deteriorated to a value larger than (or equal to if necessary) the predetermined threshold value, whether a predetermined time has elapsed or not is discriminated in step S5. In this case, whether a continuation time after the detection of the carrier of the V.21ch2 modulation and the occurrence of the deterioration of the data signal quality (EQM) larger than (or equal to if necessary) the threshold value has exceeded the predetermined time or not is discriminated.

In the embodiment, the predetermined time is equal to 250 msec. If the predetermined time does not elapse in step S5, the processing routine is returned to step S3 and the monitoring of the carrier of the V.21ch2 modulation and the monitoring of the data signal quality (EQM) are continued.

If the predetermined time has elapsed in step S5, it is determined that the procedure signal has been received. Step S6 follows and the modem 14 is set to the low-speed mode, thereby preparing for the reception of the procedure signal.

The above explanation relates to the operation of the ECM reception in the embodiment.

Subsequently, the processing operation in the case of receiving an image in the non-ECM in the embodiment will be described.

FIG. 4 is a flowchart showing the processing operation in the case of receiving an image in the non-ECM in the embodiment.

The operation in the non-ECM is substantially the same as that in the ECM except for a point that the position in the detection of the rear edge of the image is merely changed from the RCP frame to the RTC pattern.

Explanation will be sequentially made. Upon image reception in the non-ECM, when the modem 14 is set to the high-speed mode in step S11 and the image reception is started, whether the RTC pattern has been received or not is discriminated in step S12. If the RTC pattern has been received here, since this means that the image signal has been finished, step S16 follows. The modem 14 is set to the low-speed mode, thereby preparing for the reception of the procedure signal.

If it is determined in step S12 that the RTC pattern is not received, the presence or absence of the carrier of the V.21ch2 modulation is discriminated in step S13. If the carrier is not detected, the processing routine is returned to step S12 and the above processes are repeated.

If the carrier of V.21ch2 is detected in step S13, the data signal quality (EQM) of the modem is discriminated in step S14. If the data signal quality (EQM) of the modem indicates the normal value which is equal to or less than the threshold value, it is determined that the detection of the carrier of the V.21ch2 modulation in step S13 has erroneously been recognized, the processing routine is returned to step S12 and the above processes are continued.

If it is determined in step S14 that the data signal quality (EQM) has deteriorated to a value larger than (or equal to if necessary) the predetermined threshold value, whether the predetermined time has elapsed or not is discriminated in step S15. In this case, whether the continuation time from the detection of the carrier of V.21ch2 and the occurrence of the deterioration of the data signal quality (EQM) larger than (or equal to if necessary) the threshold value has exceeded the predetermined time or not is discriminated. In the embodiment, the predetermined time is equal to 250 msec. If the predetermined time does not elapse in step S15, the processing routine is returned to step S13 and the monitoring of the carrier of the V.21ch2 modulation and the monitoring of the data signal quality (EQM) are continued.

If the predetermined time has elapsed in step S15, it is determined that the procedure signal has been received. Step S16 follows and the modem 14 is set to the low-speed mode, thereby preparing for the reception of the procedure signal.

The above explanation relates to the operation in the non-ECM reception in the embodiment.

FIG. 2 is a diagram showing deviation amounts of a demodulation result from ideal points in a quadrature amplitude modulation.

The data signal quality (EQM: Eye Quality Monitor) denotes the deviation amounts of the demodulation result from the ideal points in the quadrature amplitude modulation and is equal to a square value of an error vector. As shown in FIG. 2, the larger the deviation amount is, the more the data signal quality deteriorates and the higher a possibility of generation of errors is.

While the signal is normally received, the value of the data signal quality is low enough. When the modem enters a divergent situation or when the receiver receives a signal of a modulation system other than that to be waited, it indicates a very large value.

Therefore, if the receiver cannot receive the RTC pattern or the RCP frame but receives the carrier of the V.21ch2 modulation in the state that the high-speed mode is set, the data signal quality shows the very large value. Therefore, the arrival of the procedure signal is discriminated together with the detection of the carrier of the V.21ch2 modulation, and if it is positive, the modem can advance to the low-speed mode.

Since the value of the EQM is low enough while the high-speed signal is normally received, even if the carrier of the V.21ch2 modulation is erroneously detected, such a situation that the modem advances to the low-speed mode and the errors are generated can be avoided.

Further, in the case where the erroneous detection of the carrier of the V.21ch2 modulation and the deterioration of the data signal quality are instantaneously caused by the noises or the like, in order to prevent the modem from advancing to the low-speed mode, the modem advances to the low-speed mode only when the foregoing conditions continue for a predetermined time. Consequently, even higher availability can be obtained.

According to the embodiment, by using both of the data signal quality (EQM) and the detection of the carrier of V.21ch2, even in the case where the RTC pattern or the RCP frame cannot be received due to the noises or in the case where the modem diverges (or malfunctions) and the data cannot be normally demodulated, the procedure signal can be certainly detected, the modem can advance to the low-speed mode, and the possibility of the communication error can be remarkably reduced.

According to the embodiment, as compared with the case of only depending on the detection on V.21ch2, a possibility that the low-speed signal is erroneously detected, the modem advances to the low-speed mode despite the fact that the image is normally being received and the errors are induced, can be more effectively avoided.

The above embodiment can be grasped as an invention of a program. That is, the above embodiment is programmed an example of allowing a computer to execute: the monitoring procedure for executing, in parallel, the monitoring of the signal of the low-speed mode which is used in the procedure signal and the monitoring of the quality of the data signal in the high-speed mode, while the modem is set to the high-speed mode and the image is received; and the receiving procedure for setting the modem to the low-speed mode and receiving the procedure signal in the case where the signal of the low-speed mode is detected and the data signal quality has deteriorated to the value larger than (or equal to if necessary) the threshold value which has arbitrarily been predetermined.

According to the invention, by using both of the data signal quality (EQM) and the detection of the carrier of V.21ch2, there is an effect such that even in the case where the RTC pattern or the RCP frame cannot be received due to the noises or in the case where the modem diverges and the data cannot be normally demodulated, the procedure signal can be certainly detected, the modem can advance to the low-speed mode, and the possibility of the communication error can be remarkably reduced.

What is claimed is:

1. A communicating apparatus comprising:
    monitoring means for executing, in parallel, monitoring of a low-speed signal which is used in a procedure signal and monitoring of quality of a data signal in a high-speed mode while a modem is set to said high-speed mode and an image is received; and
    receiving means for setting the modem to a low-speed mode and receiving the procedure signal in the case where the low-speed signal is detected and the data signal quality has deteriorated to a value larger than or equal to a threshold value, and for maintaining the setting of the modem in said high-speed mode and continuing to receive the data signal in the case where the low-speed signal is detected and said data signal quality has not been deteriorated to a value larger than or equal to the threshold value,
    wherein said apparatus is a facsimile apparatus.

2. The apparatus according to claim 1, wherein said receiving means is means for switching the modem to said low-speed mode and receiving the procedure signal in the case where the detection of the low-speed signal and the deterioration of said data signal quality continues for a predetermined time or longer.

3. A non-transitory computer-readable storage medium on which is stored a computer-executable program, the program comprising computer executable code for causing a computer to execute:
    a monitoring procedure for executing, in parallel, monitoring of a low-speed signal which is used in a procedure signal and monitoring of quality of a data signal in a high-speed mode while a modem is set to said high-speed mode and an image is received; and
    a receiving procedure for setting the modem to a low-speed mode and receiving the procedure signal in the case where the low-speed signal is detected and the data signal quality has deteriorated to a value larger than or equal to a threshold value and for maintaining the setting of the modem in said high-speed mode and continuing to receive the data signal in the case where the low-speed signal is detected and said data signal quality has not been deteriorated to a value larger than or equal to the threshold value,
    wherein the procedure signal is for a facsimile communication.

4. The non-transitory computer-readable storage medium according to claim 3, wherein said receiving procedure is a receiving procedure for switching the modem to said low-speed mode and receiving the procedure signal in the case where the detection of the low-speed signal and the deterioration of said data signal quality continued for a predetermined time or longer.

5. A communication method, comprising:
    a monitoring step of executing, in parallel, monitoring of a low-speed signal which is used in a procedure signal and monitoring of quality of a data signal in a high-speed mode while a modem is set to said high-speed mode and an image is received; and
    a receiving step of setting the modem to a low-speed mode and receiving the procedure signal in the case where the low-speed signal is detected and the data signal quality has deteriorated to a value larger than or equal to a threshold value and for maintaining the setting of the modem in said high-speed mode and continuing to receive the data signal in the case where the low-speed signal is detected and said data signal quality has not been deteriorated to a value larger than or equal to the threshold value.

6. The communication method according to claim 5, wherein said receiving step is a receiving procedure for switching the modem to said low-speed mode and receiving the procedure signal in the case where the detection of the low-speed signal and the deterioration of said data signal quality continued for a predetermined time or longer.

7. The communication method according to claim 5, wherein the procedure signal is for a facsimile communication.

* * * * *